US009284830B2

(12) United States Patent
Frisk et al.

(10) Patent No.: US 9,284,830 B2
(45) Date of Patent: Mar. 15, 2016

(54) METHOD FOR RECOVERING HYDROCARBON FLUIDS USING A HYDRAULIC FRACTURING PROCESS

(71) Applicant: E I DU PONT DE NEMOURS AND COMPANY, Wilmington, DE (US)

(72) Inventors: Simon Frisk, Newark, DE (US); Hyun Sung Lim, Midlothian, VA (US); Lisa C Bates, Chester, VA (US); Peter Andrin, Bath (CA); Basil El-Borno, Calgary Alberta (CA)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 10 days.

(21) Appl. No.: 13/848,792

(22) Filed: Mar. 22, 2013

(65) Prior Publication Data

US 2013/0248175 A1    Sep. 26, 2013

Related U.S. Application Data

(60) Provisional application No. 61/614,111, filed on Mar. 22, 2012.

(51) Int. Cl.
*E21B 43/34* (2006.01)
*B32B 27/32* (2006.01)
*C10G 25/00* (2006.01)
*C10G 31/09* (2006.01)
*C10G 33/06* (2006.01)
*C10G 7/04* (2006.01)
*C02F 1/00* (2006.01)
*C02F 1/28* (2006.01)
*C02F 1/40* (2006.01)
*C02F 1/52* (2006.01)
*C02F 1/60* (2006.01)
*C02F 11/12* (2006.01)
*C02F 11/14* (2006.01)
*C02F 101/32* (2006.01)
*C02F 103/10* (2006.01)
*C02F 103/36* (2006.01)

(52) U.S. Cl.
CPC .............. *E21B 43/34* (2013.01); *C02F 1/004* (2013.01); *C10G 7/04* (2013.01); *C10G 25/00* (2013.01); *C10G 31/09* (2013.01); *C10G 33/06* (2013.01); *C02F 1/281* (2013.01); *C02F 1/40* (2013.01); *C02F 1/5245* (2013.01); *C02F 1/60* (2013.01); *C02F 11/121* (2013.01); *C02F 11/14* (2013.01); *C02F 2101/32* (2013.01); *C02F 2103/10* (2013.01); *C02F 2103/365* (2013.01); *C02F 2209/40* (2013.01); *C02F 2301/08* (2013.01); *C02F 2303/16* (2013.01)

(58) Field of Classification Search
CPC .............................. C02F 2101/32; B32B 27/32
USPC ........................ 166/267; 210/747.7
See application file for complete search history.

(56) References Cited

U.S. PATENT DOCUMENTS

| | | | | |
|---|---|---|---|---|
| 390,518 | A | | 10/1888 | Rambicur |
| 2,948,677 | A | | 8/1960 | Austin at al |
| 3,169,899 | A | * | 2/1965 | Steuber .................. 428/198 |
| 3,499,532 | A | * | 3/1970 | Schneider .................. 210/138 |
| 3,589,997 | A | | 6/1971 | Grutsch et al. |
| 3,663,435 | A | | 5/1972 | Grutsch |
| 4,043,881 | A | | 8/1977 | Yen et al. |
| 4,066,538 | A | | 1/1978 | Cines et al. |
| 4,069,148 | A | | 1/1978 | Hutton et al. |
| 4,073,722 | A | | 2/1978 | Grutsch et al. |
| 4,121,662 | A | | 10/1978 | Kilburn |
| 4,124,501 | A | | 11/1978 | Yen et al. |
| 4,178,039 | A | | 12/1979 | Burton, III |
| 4,274,961 | A | | 6/1981 | Hirs |
| 4,289,578 | A | | 9/1981 | Greenfield et al. |
| 4,289,615 | A | | 9/1981 | Schneider et al. |
| 4,362,617 | A | | 12/1982 | Klepper |
| 4,366,063 | A | * | 12/1982 | O'Connor .................. 210/652 |
| 4,861,494 | A | * | 8/1989 | Bratten .................. 210/739 |
| 6,034,008 | A | * | 3/2000 | Lim et al. .................. 442/334 |
| 6,114,017 | A | | 9/2000 | Fabbricante et al. |
| 7,717,173 | B2 | * | 5/2010 | Grott .................. 166/267 |
| 7,744,989 | B2 | | 6/2010 | Marin et al. |
| 7,815,804 | B2 | | 10/2010 | Nagghappan |
| 8,047,287 | B2 | | 11/2011 | Minnich et al. |
| 2007/0215346 | A1 | * | 9/2007 | Sloan et al. .............. 166/250.01 |
| 2007/0264520 | A1 | * | 11/2007 | Wood et al. .................. 428/606 |
| 2011/0023715 | A1 | | 2/2011 | Nagghappan |
| 2011/0180263 | A1 | | 7/2011 | Mothersbaugh et al. |
| 2013/0319663 | A1 | | 12/2013 | Buchanan et al. |

FOREIGN PATENT DOCUMENTS

| | | |
|---|---|---|
| CA | 2631334 | 11/2009 |
| WO | WO 03/080905 | 10/2003 |

OTHER PUBLICATIONS

Perlmutter, "Selection of Filters for the Separation Process" (2009) Chemical Engineering World.*

(Continued)

*Primary Examiner* — Angela M DiTrani
*Assistant Examiner* — Avi Skaist

(57) ABSTRACT

A method for recovering and treating hydrocarbon fluids using a hydraulic fracturing process wherein a fluid stream containing liquid or gaseous hydrocarbon species or both, produced water, suspended solids, and dissolved contaminants is recovered from a well. Hydrocarbon species are separated from the fluid stream to produce a second fluid stream comprising liquid water, which is then directed to a filter medium and essentially all of the second fluid stream passes through the medium to produce a permeate stream and a filter cake, and the filter cake is separated from the medium and disposed of separately.

13 Claims, No Drawings

(56) References Cited

OTHER PUBLICATIONS

PCT International Search Report and Written opinion for International Application No. PCT/US2013/033454 Dated Jun. 5, 2013.

Dr. Ernest Mayer, Dupont/Oberlin Microfiltration Technology(SITE), abstract.
Wastewater Filtration Enhancement, Hollis L. Martin, 10th AESF/EPA Conference on pollution control for the metal finishing industry, Orlando FL, Jan. 23-25, 1989.

* cited by examiner

METHOD FOR RECOVERING HYDROCARBON FLUIDS USING A HYDRAULIC FRACTURING PROCESS

BACKGROUND OF THE INVENTION

1. Field of the Invention

The present invention relates to a process for recovering and treating fluids such as hydrocarbon gas and/or liquids, and produced water from a hydraulic fracturing process.

2. Description of the Related Art

The technique of hydraulic fracturing is used to increase or restore the rate at which fluids, such as oil, water, or natural gas can be produced from subterranean natural reservoirs. Reservoirs are typically porous sandstones, limestones or dolomite rocks, but also include reservoirs such as shale rock or coal beds.

A hydraulic fracture is formed by pumping fracturing fluid into the wellbore at a rate sufficient to increase pressure downhole to exceed that of the fracture gradient of the rock. The rock cracks and the fracture fluid continues farther into the rock, thereby extending the crack.

The fluid injected into the rock is typically a slurry of water, proppants, and chemical additives. Additionally, gels, foams, and compressed gases, including nitrogen, carbon dioxide and air can be injected. Various types of proppant include silica sand, resin-coated sand, and man-made ceramics. These vary depending on the type of permeability or grain strength needed. Chemical additives are applied to tailor the injected material to the specific geological situation, protect the well, and improve its operation, though the injected fluid is approximately 98-99.5% percent water, varying slightly based on the type of well. The composition of injected fluid is sometimes changed as the fracturing job proceeds. Often, acid is initially used to scour the perforations and clean up the near-wellbore area. Afterward, high pressure fracture fluid is injected into the wellbore, with the pressure above the fracture gradient of the rock. This fracture fluid contains water-soluble gelling agents (such as guar gum) which increase viscosity and efficiently deliver the proppant into the formation. As the fracturing process proceeds, viscosity-reducing agents such as oxidizers and enzyme breakers are sometimes then added to the fracturing fluid to deactivate the gelling agents and encourage flowback. The purpose of the proppant is primarily to provide a permeable and permanent filler to fill the void created during the fracturing process. At the end of the job the well is commonly flushed with water (sometimes blended with a friction reducing chemical) under pressure.

The injected fluid is to some degree recovered and is managed by several methods, such as underground injection control, treatment and discharge, recycling, or temporary storage in pits or containers. Although the concentrations of the chemical additives are very low, the recovered fluid may be harmful due in part to hydrocarbons and other species (for example, hydrogen sulfide) picked up from the formation.

The technology in use today for treating recovered hydraulic fracturing fluids has been adopted from oilfield and conventional wastewater treatment technologies. The design of the system and the unit operations deployed depend upon the requirements of the water to be treated and the regulations in force in the locale where fracturing is taking place. Commercially available technologies that have been deployed may include:

De-gassing unit operations including flash pressure separations;

De-oiling technologies that use gravity separation such as skim tanks, flotation separation processes, and oil adsorption filters sometimes used in conjunction with water-in-oil emulsion breakers and oil-in-water emulsion breakers;

Removal of suspended solids through technologies such as agglomeration, settling, filtration, hydrocyclones, or centrifugation;

Removal of dissolved chemical species through processes such as coagulation & flocculation followed by physical separation such as settling, filtration, hydrocyclones, or centrifugation; oxidation of dissolved species with chemicals or light; absorption or adsoprtion, ultra- or nano-filtration; and evaporation.

Removal of bacterial activity through disinfection chemistries, light, and/or filtration.

SUMMARY OF THE INVENTION

In one embodiment, the invention is directed to a method for recovering and treating hydrocarbon fluids using a hydraulic fracturing process. The method comprises the steps of;

i) recovering a fluid stream from a well, where the fluid stream comprises liquid or gaseous hydrocarbon species or both, produced water, suspended solids, and optionally other materials selected from the group consisting of dissolved contaminants, and combinations of the foregoing;

ii) separating the hydrocarbon species from the fluid stream to produce a second fluid stream comprising liquid water;

iv) directing the second fluid stream to a first filtration medium;

v) passing essentially all of the second fluid stream through the medium to produce a permeate stream and a filter cake;

vi) reusing, recycling or disposing of the treated fluid stream.

The medium may have an efficiency of 30% or greater for particles of 1 micrometer size or greater and a flow rate of 2 milliliters per minute per centimeter squared of media per kilopascal pressure of the liquid ($ml/min/cm^2/kPa$). Filtering the produced water with the medium produces a filter cake upstream of, and in contact with, the medium and concentrated with suspended solids and other precipitated particles. The filter cake is allowed to build to a pre-determined level and after having reached said level, the filter cake is dewatered, separated from the filter medium, and disposed of separately from the filter medium.

In a further embodiment of the method, the produced water comprises source water (as included in the definition of "injection water" below) that has undergone the process of;

i) directing the source water to a second filtration medium;

ii) passing essentially all the source water flow through the second filtration medium to produce a permeate stream and a filter cake;

iii) injecting the permeate stream into the well.

The medium may have an efficiency of 30% or greater for particles of 1 micrometer size or greater and a flow rate of 2 milliliters per minute per centimeter squared of media per kilopascal pressure of the liquid ($ml/min/cm^2/kPa$). Filtering the produced water with the medium produces a filter cake upstream of, and in contact with, the medium and concentrated with suspended solids and other precipitated particles and the filter cake is allowed to build to a pre-determined level, and after having reached said level, the filter cake is dewatered, separated from the filter medium, and disposed of separately from the filter medium.

In a still further embodiment, the method is directed to treating source water comprising the steps of;
 i) directing the source water to a filtration medium;
 ii) passing essentially all the source water flow through the second filtration medium to produce a permeate stream and a filter cake;
 iii) injecting the permeate stream into a well.

The medium may have an efficiency of 30% or greater for particles of 1 micrometer size or greater and a flow rate of 2 milliliters per minute per centimeter squared of media per kilopascal pressure of the liquid (ml/min/cm$^2$/kPa). Filtering the produced water with the medium produces a filter cake upstream of, and in contact with, the medium and concentrated with suspended solids and other precipitated particles and wherein the filter cake is allowed to build to a pre-determined level, and after having reached said level, the filter cake is dewatered, separated from the filter medium, and disposed of separately from the filter medium.

DETAILED DESCRIPTION OF THE INVENTION

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

DEFINITION OF TERMS

The term "produced water" as used herein, is intended to mean the water recovered during and after a hydraulic fracturing operation and through the life of the well. For example, in the oil and gas industry, produced water means the water brought up from the hydrocarbon-bearing formation strata during the extraction of oil and gas, and can include formation water, injection water, and any chemicals added downhole or during the oil/water separation process. Herein, the term "produced water" therefore also includes the portion of the water that is recovered immediately following the fracturing operation (including the "flowback water" as commonly termed).

The term "injection water" as used herein, is intended to mean the water that is used in the fracturing operation. This water can be, for example, composed of recycled water or various source waters, such as surface water, saline and non-saline groundwater, wastewater from industrial operations, and wastewater from municipal water treatment operations, or any blend thereof.

The term "gas" refers to gaseous products from the hydraulic fracturing operation that are recovered in combination with produced water.

When a fluid stream is said to comprise "mainly" water, this term means that the stream contains 95% or more by weight of water.

"Fracturing additives" are any compounds, including for example proppants, gels, foams, viscosity modifiers etc. that are added to injection water to facilitate the fracturing process.

The term "polymer" as used herein, generally includes but is not limited to, homopolymers, copolymers (such as for example, block, graft, random and alternating copolymers), terpolymers, etc., and blends and modifications thereof. Furthermore, unless otherwise specifically limited, the term "polymer" shall include all possible geometrical configurations of the material. These configurations include, but are not limited to isotactic, syndiotactic, and random symmetries.

The term "polyolefin" as used herein, is intended to mean any of a series of largely saturated polymeric hydrocarbons composed only of carbon and hydrogen. Typical polyolefins include, but are not limited to, polyethylene, polypropylene, polymethylpentene, and various combinations of the monomers ethylene, propylene, and methylpentene.

The term "polyethylene" as used herein is intended to encompass not only homopolymers of ethylene, but also copolymers wherein at least 85% of the recurring units are ethylene units such as copolymers of ethylene and alpha-olefins. Preferred polyethylenes include low-density polyethylene, linear low-density polyethylene, and linear high-density polyethylene. A preferred linear high-density polyethylene has an upper limit melting range of about 130° C. to 140° C., a density in the range of about 0.941 to 0.980 gram per cubic centimeter, and a melt index (as defined by ASTM D-1238-57T Condition E) of between 0.1 and 100, and preferably less than 4.

The term "polypropylene" as used herein is intended to embrace not only homopolymers of propylene but also copolymers where at least 85% of the recurring units are propylene units. Preferred polypropylene polymers include isotactic polypropylene and syndiotactic polypropylene.

The term "nonwoven" as used herein means a sheet structure of individual fibers or threads that are positioned in a random manner to form a planar material without an identifiable pattern, as in a knitted fabric.

The term "plexifilament" as used herein means a three-dimensional integral network or web of a multitude of thin, ribbon-like, film-fibril elements of random length and with a mean film thickness of less than about 4 micrometers and a median fibril width of less than about 25 micrometers. The average film-fibril cross sectional area if mathematically converted to a circular area would yield an effective diameter between about 1 micrometer and 25 micrometers. In plexifilamentary structures, the film-fibril elements intermittently unite and separate at irregular intervals in various places throughout the length, width and thickness of the structure to form a continuous three-dimensional network.

The process of the invention calls for "essentially all" or "essentially 100%" of the water impinging on the filter medium to pass through it. By "essentially all" is meant that the only produced water that does not pass through the medium is that which is lost by leakage or waste. There is no separate retentate stream produced by the process.

EMBODIMENTS OF THE INVENTION

The present invention is directed to a process that utilizes filtration media in hydrocarbon fluid recovery processes. The invention is also directed to a system for recovering hydrocarbon fluid that treats essentially 100% of the water that is used in the hydrocarbon fluid extraction part of the process.

In one embodiment, the invention is directed to a method for recovering and treating fluids from a hydraulic fracturing process. The method comprising the steps of;
 i) recovering a fluid stream from the well, where the fluid stream comprises liquid or gaseous hydrocarbon species or both, produced water, suspended solids, and optionally other materials selected from the group consisting of dissolved contaminants, and combinations of the foregoing;

ii) separating the hydrocarbon species from the fluid stream to produce a second fluid stream comprising liquid water;

iv) directing the second fluid stream to a first filtration medium;

v) passing essentially all of the second fluid stream through the medium to produce a permeate stream and a filter cake;

vi) reusing, recycling or disposing of the treated fluid stream.

The medium may have an efficiency of 30% or greater for particles of 1 micrometer size or greater and a flow rate of 2 milliliters per minute per centimeter squared of media per kilopascal pressure of the liquid (ml/min/cm$^2$/kPa).

Filtering the produced water with the medium produces a filter cake upstream of, and in contact with, the medium and concentrated with suspended solids and other precipitated particles. The filter cake is allowed to build to a pre-determined level and after having reached said level, the filter cake is dewatered, separated from the filter medium, and disposed of separately from the filter medium.

In a further embodiment of the method, the produced water comprises source water that has undergone the process of; directing the source water to a second filtration medium; passing essentially all the source water flow through the second filtration medium to produce a permeate stream and a filter cake; and injecting the permeate stream into the well from which produced water will be obtained. The permeate stream may be temporarily stored in holding tanks prior to injection. Fracturing additives may be added to the source water either before or after the step in which the source water is passed through a filter medium.

The medium may have an efficiency of 30% or greater for particles of 1 micrometer size or greater and a flow rate of 2 milliliters per minute per centimeter squared of media per kilopascal pressure of the liquid (ml/min/cm$^2$/kPa), Filtering the produced water with the medium produces a filter cake upstream of, and in contact with, the medium and concentrated with suspended solids and other precipitated particles and the filter cake is allowed to build to a pre-determined level, and after having reached said level, the filter cake is dewatered, separated from the filter medium, and disposed of separately from the filter medium.

Turning now to a description of the process steps individually.

Separation of Liquid Hydrocarbons

Liquid hydrocarbons are typically separated from the fluid stream by gravity settlement of the aqueous component of the fluid leaving an oily layer above the aqueous layer.

As a first step in the treatment of oil-contaminated water, it is common practice to effect a rough separation in a primary gravity separator to remove the bulk of the oil and suspended solids. Suitable separators include API Separators, parallel plate separators and settlement tanks. API Separators are described in the "Manual on Disposal of Refinery Wastes", published by the American Petroleum Institute in 1969.

During this separation, oil usually associated with stabilizing contaminants rises to the surface, oily sediment settles to the bottom and water containing relatively small concentrations of oil and suspended solids passes through the separator, over the effluent weir and on to further treatment.

Pumps can be used to remove oil and water that have settled. For example, an oil pump is disposed in the formation and immersed in the oil layer and pumps the oil into an oil storage tank. A water pump is disposed in the formation and immersed in the water layer and pumps water to an oil/water separator. There will be some emulsified oil present in the water even though it exists as a separate layer. This emulsified oil is separated from the bulk of the water and forms a layer on top of the water in the oil/water separator. The water in the oil/water separator is pumped through a filter system to remove any trace amounts of oil from the water and then the water is either returned to the ground or passed into a water distribution system for use by humans.

A skimmer pump may be located in the oil/water separator which periodically operates to skim oil from the surface of the water in the oil/water separator and pump it into the oil storage tank. Thus, the bulk of the oil in the formation is separated from the water and collected separately. Since this oil will ordinarily have value, collecting it is important so that it can be sold or used.

Produced Water Pre-Treatment

Over the years, a variety of methods have been suggested for purifying or otherwise processing oil shale retort water. Such methods have included shale adsorption, in situ recycling, electrolysis, flocculation, bacteria treatment and mineral recovery. Typifying such methods and methods for treating waste water from refineries and chemical and sewage plants are those described in U.S. Pat. Nos. 2,948,677; 3,589,997; 3,663,435; 3,904,518; 4,043,881; 4,066,538; 4,069,148; 4,073,722; 4,124,501; 4,178,039; 4,121,662 and 4,289,578. These methods have met with varying degrees of success.

The produced water may also be dosed, prior to contact with the filter medium, with various chemicals and other additives. An example could be a crystal-forming compound such as magnesium oxide. The crystal-forming compound forms crystals in the produced water that adsorb silica, resulting in silica being driven or pulled out of solution and adsorbed on the formed crystals. Various crystal forming materials can be added. In some cases magnesium may be added in the form of magnesium oxide or magnesium chloride. In any event, the magnesium compound forms magnesium hydroxide crystals that function to sorb silica in the produced water, resulting in the conversion of silica from soluble to insoluble form. It should be noted that there is typically an insufficient concentration of magnesium found in produced water to yield a substantial amount of magnesium hydroxide crystals. Thus, in the case of using magnesium for crystal formation, the process generally requires the addition of magnesium to the produced water. Other reagents or compounds may also be mixed with the produced water to remove silica through precipitation or adsorption. For example, ferric chloride, aluminum oxide, aluminum sulfate, calcium oxide or alum may be mixed with the produced water. In some cases, the dissolved silica and the produced water can be removed from solution by mixing compounds with the produced water where the compounds have surface-active properties. The surface-active properties may draw silica out of solution. Examples of such compounds are oxides of aluminum, silica and titanium.

Filter Media

The present invention utilizes a filtration medium to substantially clean produced water as part of a water cleaning and purification process that provides water for injection into hydrocarbon-bearing formations, or otherwise for safe disposal. In the embodiments described, a filtration medium is utilized upstream of other water purification processes. A filtration medium process may also be utilized elsewhere in such overall processes for removal of oil and other undesirable contaminants from the water.

Filtration media, useful in the processes disclosed herein, can be of various types. Media can be a nonwoven or a woven structure. The media can be a combination of multiple layers. The filtration media may be designed to withstand relatively high temperatures.

In a preferred embodiment, the media of the present invention comprises a nonwoven sheet, or a multilayered structured composed of at least one nonwoven sheet. The nonwoven sheet may comprise polymeric and/or non-polymeric fibers. The nonwoven sheet may also comprise inorganic fibers. The polymeric fibers are made from polymers selected from the group consisting of polyolefins, polyesters, polyamides, polyaramids, polysulfones and combinations thereof. The polymeric fibers may have an average diameter above or below 1 micrometer, and be essentially round, or have non-circular or more complex cross-sectional shapes. The nonwoven sheet has a water flow rate per unit area of the sheet, per unit pressure drop across the sheet of at least 3, 5, 10, 15 or even 20 ml/min/cm$^2$/kPa, a filtration efficiency rating of at least 30, 40, 50, 60, 70 or even 80% at a 1.0 micrometer particle size, a life of a least 150 min, as testing herein.

In one embodiment, the nonwoven sheet is composed of high-density polyethylene fibers made according to the flash-spinning process disclosed in U.S. Pat. No. 7,744,989 to Marin et al., which is hereby incorporated by reference, with additional thermal stretching prior to sheet bonding. Preferably, the thermal stretching comprises uniaxially stretching the unbonded web in the machine direction between heated draw rolls at a temperature between about 124° C. and about 154° C., positioned at relatively short distances less than 32 cm apart, preferably between about 5 cm and about 30 cm apart, and stretched between about 3% and 25% to form the stretched web. Stretching at draw roll distances more than 32 cm apart may cause significant necking of the web which would be undesirable. Typical polymers used in the flash-spinning process are polyolefins, such as polyethylene and polypropylene. It is also contemplated that copolymers comprised primarily of ethylene and propylene monomer units, and blends of olefin polymers and copolymers could be flash-spun. For example, a liquid filtration medium can be produced by a process comprising flash spinning a solution of 12% to 24% by weight polyethylene in a spin agent consisting of a mixture of normal pentane and cyclopentane at a spinning temperature from about 205° C. to 220° C. to form plexifilamentary fiber strands and collecting the plexifilamentary fiber strands into an unbonded web, uniaxially stretching the unbonded web in the machine direction between heated draw rolls at a temperature between about 124° C. and about 154° C., positioned between about 5 cm and about 30 cm apart and stretched between about 3% and 25% to form the stretched web, and bonding the stretched web between heated bonding rolls at a temperature between about 124° C. and about 154° C. to form a nonwoven sheet. The nonwoven sheet has a water flow rate of at least 5, preferably 20, ml/min/cm$^2$/kPa, a filtration efficiency rating of at least 60% at a 1.0 micrometer particle size, and a life expectancy of at least 150 minutes.

In one embodiment, the polymeric fibers are made from polyether sulfone using the electroblowing process for making the nanofiber layer(s) of the filtration medium disclosed in International Publication Number WO2003/080905 (U.S. Ser. No. 10/822,325), which is hereby incorporated by reference. The electroblowing method comprises feeding a solution of a polymer in a solvent from mixing chamber through a spinning beam, to a spinning nozzle to which a high voltage is applied, while compressed gas is directed toward the polymer solution in a blowing gas stream as it exits the nozzle. Nanofibers are formed and collected as a web on a grounded collector under vacuum created by vacuum chamber and blower. For example, the resulting nonwoven sheet has a water flow rate of at least 30 ml/min/cm$^2$/kPa, a filtration efficiency rating of at least 30% at a 1.0 micrometer particle size, and a life expectancy of at least 250 minutes.

The media of the invention may further comprise a scrim layer in which the scrim is located adjacent to the nonwoven sheet. A "scrim", as used here, is a support layer and can be any planar structure which optionally can be bonded, adhered or laminated to the nonwoven sheet. Advantageously, the scrim layers useful in the present invention are spunbond nonwoven layers, but can be made from carded webs of nonwoven fibers and the like.

Filtration media may also have an asymmetrical structure composed of at least two, mostly three, different porosity levels. An example of such structure may be one in which the top layer provides the main filtration performance, the intermediate layer provides a pre-filtration layer to extend the life of the top layer and bottom layer provides the support to ensure the mechanical resistance of the filter.

Filter System

In one embodiment, the filtration medium is used in a pressure filter system. The filter assembly typically comprises a vertical or horizontal stack of filter plates including a lower filter plate and an upper filter plate, one of which is mounted to a rigid structure or frame, called the filter press, and a variable number of intermediate filter plates, movably mounted to the fixed plate or filter press, between the upper and lower plates. A layer of filter media, usually provided in long sheet-like rolls, is placed between each pair of filter plates. Each pair of filter plates, together with the filter media between the members of a pair, forms dirty and clean compartments. The dirty compartment receives unfiltered, contaminated liquid under pressure which is thus forced through the filter media, thereby depositing the filter cake solids (contaminants with or without a filter aid) on the filter media. The resultant clean, filtered liquid enters the clean compartment of the adjacent plate and exits the filter assembly.

During the filtration process a cake builds up on the filtration medium and upstream and in contact with it. The cake is essentially solid and porous, and allows produce water to pass through it while also acting to filter out suspended particles. When the cake size reaches a pre-determined level, the filter medium plus cake is removed from the process stream and replaced by a fresh filter medium with no cake, or only a partial cake, formed thereon. The replacement of the filter medium can be done manually or automatically, such as when using an automatic pressure filter. The cake is separated from the medium and collected as waste. The process of building up a cake is repeated. Normally the pre-determined level will be determined as the point at which the pressure required to maintain acceptable flow through the cake plus medium combination is too high for the operation. Alternatively, the pre-determined level could be the point at which the flow is reduced below an acceptable level, at a specific fluid pressure.

The method of the invention also includes the step of dewatering the cake, either before or after separation of the cake from the filter medium. Dewatering can be achieved, for example, by applying mechanical pressure to the cake, for example by squeezing between rolls or membranes and allowing excess liquid to drain away from the cake.

The cake and the medium are separated, for example by indexing the medium plus cake over a roll and doctor knife or wire. After separation, the used medium and the cake are disposed of separately, for example by landfilling in an appropriate location.

Certain applications may require the filter media discussed above to be supplemented with the addition of filter aids in the form of diatomaceous earth and/or Fuller's earth, or other similar products. These filter aids contribute in the formation a filter cake on the filter media, which may facilitate the separation of the particles and other contaminants from the liquid to further purify the working liquid in the filter assembly.

The use of filter aids is discussed herein since, when the filter aids are used, they combine with impurities from the dirty liquid to form a filter cake deposited upon the filter media. As noted above, filter assemblies of the type contemplated by the present invention are adapted for retrieval of the spent filter media and it is desirable to first separate the filter solids from the filter media. Otherwise, the use of filter aids and the manner in which they are selected and introduced into the filter system are not within the scope of the present invention and accordingly are not discussed in greater detail herein.

Filter assemblies including filter stacks with multiple filter chambers or compartments and employing filter media for separating solid contaminants from a dirty liquid have been disclosed for example in U.S. Pat. No. 4,274,961 issued Jun. 23, 1981 to Hirs; U.S. Pat. No. 4,289,615 issued Sep. 15, 1981 to Schneider, et al. and U.S. Pat. No. 4,362,617 issued Dec. 7, 1982 to Klepper.

An advantage of the method of the present invention is the easy removal of particulates from a slurry of particulates and a liquid.

The present invention may be carried out in ways other than those specifically set forth herein without departing from essential characteristics of the invention. The present embodiments are to be considered in all respects as illustrative and not restrictive, and all changes coming within the meaning and equivalency range of the appended claims are intended to be embraced therein.

EXAMPLES

In the non-limiting Examples that follow, the following test methods were employed to determine various reported characteristics and properties. ASTM refers to the American Society of Testing Materials.

Basis Weight was determined by ASTM D-3776, which is hereby incorporated by reference and report in $g/m^2$.

Water Flow Rate was determined as follows. A closed loop filtration system consisting of a 60 liter high density polyethylene (HDPE) storage tank, Levitronix LLC (Waltham, Mass.) BPS-4 magnetically coupled centrifugal high purity pump system, Malema Engineering Corp. (Boca Raton, Fla.) M-2100-T3104-52-U-005/USC-731 ultrasonic flow sensor/meter, a Millipore (Billerica, Mass.) 90 mm diameter stainless steel flat sheet filter housing (51.8 $cm^2$ filter area), pressure sensors located immediately before and after the filter housing and a Process Technology (Mentor, Ohio) TherMax2 IS1.1-2.75-6.25 heat exchanger located in a separate side closed loop.

A 0.1 micrometer filtered deionized (DI) water was added to a sixty liter HDPE storage tank. The Levitronix pump system was used to automatically, based on the feedback signal from the flowmeter, adjust the pump rpm to provide the desired water flow rate to the filter housing. The heat exchanger was utilized to maintain the temperature of the water to approximately 20° C. Prior to water permeability testing, the cleanliness of the filtration system was verified by placing a 0.2 micrometer polycarbonate track etch membrane in the filter housing and setting the Levitronix pump system to a fixed water flow rate of 1000 ml/min. The system was declared to be clean if the delta pressure increased by <0.7 KPa over a 10 minute period.

The track etch membrane was removed from the filter housing and replaced with the media for water permeability testing. The media was then wetted with isopropyl alcohol and subsequently flushed with 1-2 liters of 0.1 micrometer filtered DI water. The water permeability was tested by using the Levitronix pump system to increase the water flow rate at 60 ml/min intervals from 0 to 3000 ml/min. The upstream pressure, downstream pressure and exact water flow rate were recorded for each interval. The slope of the pressure vs. flow curve was calculated in $ml/min/cm^2/KPa$, with higher slopes indicating higher water permeability.

Filtration Efficiency measurements were made by test protocol developed by ASTM F795. A 50 ppm ISO test dust solution was prepared by adding 2.9 g of Powder Technology Inc. (Burnsville, Minn.) ISO 12103-1, A3 medium test dust to 57997.1 g, 0.1 micrometer filtered DI water in a sixty liter HDPE storage tank. Uniform particle distribution was achieved by mixing the solution for 30 minutes prior to filtration and maintained throughout the filtration by using an IKA Works, Inc. (Wilmington, N.C.) RW 16 Basic mechanical stirrer set at speed nine with a three inch diameter three-blade propeller and also re-circulated with a Levitronix LLC (Waltham, Mass.) BPS-4 magnetically coupled centrifugal high purity pump system. Temperature was controlled to approximately 20° C. using a Process Technology (Mentor, Ohio) TherMax2 IS1.1-2.75-6.25 heat exchanger located in a side closed loop.

Prior to filtration, a 130 ml sample was collected from the tank for subsequent unfiltered particle count analysis. Filtration media was placed in a Millipore (Billerica, Mass.) 90 mm diameter stainless steel flat sheet filter housing (51.8 $cm^2$ filter area), wetted with isopropyl alcohol and subsequently flushed with 1-2 liters of 0.1 micrometer filtered DI water prior to starting filtration.

Filtration was done at a flow rate of 200 ml/min utilizing a single pass filtration system with a Malema Engineering Corp. (Boca Raton, Fla.) M-2100-T3104-52-U-005/USC-731 ultrasonic flow sensor/meter and pressure sensors located immediately before and after the filter housing. The Levitronix pump system was used to automatically (based on the feedback signal from the flowmeter) adjust the pump rpm to provide constant flow rate to the filter housing. The heat exchanger was utilized to control the temperature of the liquid to approximately 20° C. in order to remove this variable from the comparative analysis as well as reduce evaporation of water from the solution that could skew the results due to concentration change.

The time, upstream pressure and downstream pressure were recorded and the filter life was recorded as the time required to reach a delta pressure of 69 kPa.

Filtered samples were collected at the following intervals: 2, 5, 10, 20, 30, 60 and 90 minutes for subsequent particle count analysis. The unfiltered and filtered samples were measured for particle counts using Particle Measuring Systems Inc. (Boulder, Colo.) Liquilaz SO2 and Liquilaz SO5 liquid optical particle counters. In order to measure the particle counts, the liquids were diluted with 0.1 micrometer filtered DI water to a final unfiltered concentration at the Liquilaz SO5 particle counting sensor of approximately 4000 particle counts/ml. The offline dilution was done by weighing (0.01 g accuracy) 880 g 0.1 micrometer filtered DI water and 120 g 50 ppm ISO test dust into a 1 L bottle and mixing with a stir bar for 15 minutes. The secondary dilution was done online by injecting a ratio of 5 ml of the diluted ISO test dust into 195 ml 0.1 micrometer filtered DI water, mixing with a inline static mixer and immediately measuring the particle counts. Filtration efficiency was calculated at a given particle size from the ratio of the particle concentration passed by the medium to the particle concentration that impinged on the medium within a particle "bin" size using the following formula.

$$\text{Efficiency}_{size}(\%) = (N_{upstream} - N_{downstream}) * 100/N_{upstream}$$

Life Expectancy (synonymous with "capacity") is the time required to reach a terminal pressure of 10 psig (69 kPa) across the filter media during the filtration test described above.

Mean Flow Pore Size was measured according to ASTM Designation E 1294-89, "Standard Test Method for Pore Size Characteristics of Membrane Filters Using Automated Liquid Porosimeter." with a capillary flow porosimeter (model number CFP-34RTF8A-3-6-L4, Porous Materials, Inc. (PMI), Ithaca, N.Y.). Individual samples of different sizes (8, 20 or 30 mm diameter) were wetted with a low surface tension fluid (1,1,2,3,3,3-hexafluoropropene, or "Galwick," having a surface tension of 16 dyne/cm) and placed in a holder, and a differential pressure of air is applied and the fluid removed from the samples. The differential pressure at which wet flow is equal to one-half the dry flow (flow without wetting solvent) is used to calculate the mean flow pore size using supplied software.

Nominal Rating 90% Efficiency is a measure of the ability of the media to remove a nominal percentage (i.e. 90%) by weight of solid particles of a stated micrometer size and above. The micrometer ratings were determined at 90% efficiency at a given particle size.

Examples 1 and 2

Examples 1 and 2 were made from flash spinning technology as disclosed in U.S. Pat. No. 7,744,989, incorporated herein by reference, with additional thermal stretching prior to sheet bonding. Unbonded nonwoven sheets were flash spun from a 20 weight percent concentration of high density polyethylene having a melt index of 0.7 g/10 min (measured according to ASTM D-1238 at 190° C. and 2.16 kg load) in a spin agent of 60 weight percent normal pentane and 40 weight percent cyclopentane. The unbonded nonwoven sheets were stretched and whole surface bonded. The sheets were run between pre-heated rolls at 146° C., two pairs of bond rolls at 146° C., one roll for each side of the sheet, and backup rolls at 146° C. made by formulated rubber that meets Shore A durometer of 85-90, and two chill rolls. Examples 1 and 2 were stretched 6% and 18% between two pre-heated rolls with 10 cm span length at a rate of 30.5 and 76.2 m/min, respectively. The delamination strength of Examples 1 and 2 was 0.73 N/cm and 0.78 N/cm, respectively. The sheets' physical and filtration properties are given in the Table.

Example 3

Example 3 was prepared similarly to Examples 1 and 2, except without the sheet stretching. The unbonded nonwoven sheet was whole surface bonded as disclosed in U.S. Pat. No. 7,744,989. Each side of the sheet was run over a smooth steam roll at 359 kPa steam pressure and at a speed of 91 m/min. The delamination strength of the sheet was 1.77 N/cm. The sheet's physical and filtration properties are given in the Table.

Examples 4-6

Examples 4-6 were PolyPro XL disposal filters PPG-250, 500 and 10C which are rated by retention at 2.5, 5 and 10 micrometers, respectively (available from Cuno of Meriden, Conn.). There are composed of polypropylene calendered meltblown filtration media rated for 2.5, 5 and 10 micrometer, respectively. The sheets' physical and filtration properties are given in the Table.

Example 7

Example 7 is a polyether sulfone nanofiber based nonwoven sheet made by an electroblowing process as described in WO 03/080905. PES (available through HaEuntech Co, Ltd. Anyang SI, Korea, a product of BASF) was spun using a 25 weight percent solution in a 20/80 solvent of N,N Dimethylacetamide (DMAc) (available from Samchun Pure Chemical Ind. Co Ltd, Gyeonggi-do, Korea), and N,N Dimethyl Formamide (DMF) (available through HaEuntech Co, Ltd. Anyang SI, Korea, a product of Samsung Fine Chemical Co). The polymer and the solvent were fed into a solution mix tank, and then the resulting polymer solution transferred to a reservoir. The solution was then fed to the electro-blowing spin pack through a metering pump. The spin pack has a series of spinning nozzles and gas injection nozzles. The spinneret is electrically insulated and a high voltage is applied. Compressed air at a temperature between 24° C. and 80° C. was injected through the gas injection nozzles. The fibers exited the spinning nozzles into air at atmospheric pressure, a relative humidity between 50 and 72% and a temperature between 13° C. and 24° C. The fibers were laid down on a moving porous belt. A vacuum chamber beneath the porous belt assisted in the laydown of the fibers. The number average fiber diameter for the sample, as measured by technique described earlier, was about 800 nm. The physical properties and filtration performance of the produced sheet are listed in the following table.

Examples 8 and 9

Examples 8 and 9 were meltblown nonwoven sheets made from polypropylene nanofibers. They were made according to the following procedure. A 1200 g/10 min melt water flow rate polypropylene was meltblown using a modular die as described in U.S. Pat. No. 6,114,017. The process conditions that were controlled to produce these samples were the attenuating air water flow rate, air temperature, polymer water flow rate and temperature, die body temperature, die to collector distance. Along with these parameters, the basis weights were varied by changing the changing the collection speed and polymer through put rate. The average fiber diameters of these samples were less than 500 nm. The sheets' physical and filtration properties are given in the Table.

Comparative Example A

Comparative Example A was Tyvek® SoloFlo® (available from DuPont of Wilmington, Del.), a commercial flash spun nonwoven sheet product for liquid filtration applications such as waste water treatments. The product is rated as a 1 micrometer filter media which has 98% efficiency with 1 micrometer particles. The sheet's physical and filtration properties are given in the Table.

Comparative Example B

Comparative Examples B is a PolyPro XL disposal filters PPG-120 which is rated by retention at 1.2 micrometers (available from Cuno of Meriden, Conn.). It consists of polypropylene calendered meltblown filtration media rated for 1.2 micrometers. The sheet's physical and filtration properties are given in the Table.

Comparative Examples C and D

Comparative Examples C and D were Oberlin 713-3000 a polypropylene spunbond/meltblown nonwoven sheet composite and Oberlin 722-1000 a polypropylene spunbond/meltblown/spunbond nonwoven sheet composite (available from Oberlin Filter Co. of Waukesha, Wis.). The sheets' physical and filtration properties are given in the Table.

Comparative Examples E

Comparative Example E is a precision woven synthetic monofilament fabric (i.e. mesh). The polyethylene terephthalate mesh characterized is PETEX 07-10/2 produced by Sefar (available from Sefar Inc., Depew, N.Y.). It is a highly specialized monofilament fabric characterized by precisely defined and controlled, consistent and repeatable material properties such as pore size, thickness, tensile strength, dimensional stability, cleanliness etc. The properties are listed in the following Table. In the Table, μm is used instead of micrometer for the sake of convenience.

ii) separating the hydrocarbon species from the fluid stream to produce a second fluid stream comprising liquid water;
iii) directing the second fluid stream to a first filtration medium;
iv) passing essentially all of the second fluid stream through the medium to produce a permeate stream and a filter cake;
v) reusing, recycling or disposing of the treated fluid stream wherein the medium is a nonwoven sheet and has an efficiency of 60% or greater for particles of 1 micrometer size or greater and a water flow per unit area of the sheet, per unit pressure drop across the sheet of at least 20 milliliters per minute per centimeter squared of medium per kilopascal pressure of the liquid (ml/min/cm$^2$/kPa), and a life expectancy of at least 150 minutes, and wherein filtering the produced water with the medium produces a filter cake upstream of, and in contact with, the medium and concentrated with suspended solids and other precipitated particles, and wherein the filter cake is allowed to build to a pre-determined level and after having reached said level, the filter cake is dewatered, separated from the filter medium, and disposed of separately from the filter medium.

2. The method of claim 1 wherein the produced water comprises source water that has undergone the process of:
i) directing the source water to a second filtration medium;
ii) passing essentially all the source water flow through the second filtration medium to produce a permeate stream and a filter cake;
iii) injecting the permeate stream into the well;

wherein the medium has an efficiency of 30% or greater for particles of 1 micrometer size or greater and a flow rate of 20

| | | | | | Filtration efficiency | | | | |
| --- | --- | --- | --- | --- | --- | --- | --- | --- | --- |
| Example | Media | BW (g/m2) | Thickness (μm) | MFP (μm) | Water Permeability (ml/min/cm$^2$/Kpa) | % eff. @1.0 μm | % eff. @2.0 μm | % eff. @3.0 μm | μm for 90% eff. | Life (min) to Δ10 psi |
| 1 | FS HDPE-1 | 41.6 | 229 | 6.2 | 39.8 | 70.8 | 91.0 | 94.8 | 1.9 | 189 |
| 2 | FS HDPE-2 | 47.1 | 255 | 7.3 | 25.5 | 68.0 | 91.4 | 96.1 | 1.9 | 180 |
| 3 | FS-HDPE-3 | 51.4 | 208 | 5.0 | 7.3 | 84.7 | 97.4 | 98.9 | 1.3 | 196 |
| 4 | MB PP-1 | 98.3 | 346 | 1.4 | 2.1 | 96.3 | 99.6 | 99.6 | 0.65 | 210 |
| 5 | MB PP-2 | 98.8 | 425 | 1.9 | 4.4 | 83.7 | 97.9 | 98.5 | 1.2 | 242 |
| 6 | MB PP-3 | 147.2 | 752 | 2.4 | 11.2 | 76.7 | 97.9 | 98.9 | 1.35 | 259 |
| 7 | NFBM PES | 39.1 | 170 | 3.5 | 35.0 | 38.7 | 84.4 | 94.9 | 2.4 | 292 |
| 8 | NFBM PP-1 | 62.5 | 463 | 5.9 | 36.8 | 41.4 | 83.0 | 92.7 | 2.75 | 334 |
| 9 | NFBM PP-2 | 51.3 | 377 | 7.8 | 41.0 | 45.1 | 75.0 | 87.3 | 3.5 | 313 |
| A | FS-HDPE-4 | 40.3 | 140 | 2.8 | 1.8 | 97.9 | 99.8 | 99.8 | 0.4 | 72 |
| B | MB PP-4 | 105.4 | 330 | 0.8 | 0.7 | 99.6 | 99.7 | 99.7 | 0.33 | 182 |
| C | SM PP | 71.3 | 416 | 10.8 | 71.1 | 10.7 | 31.0 | 45.1 | 10 | 288 |
| D | SMS PP | 48.9 | 297 | 12.0 | 140.9 | 16.8 | 32.1 | 40.9 | >10 | 193 |
| E | PET mesh | 54.3 | 48 | 9.2 | 26.2 | 26.6 | 51.8 | 64.2 | 8.0 | 129 |

The nonwoven sheet of the Examples demonstrate an improvement in the overall combination of water flow rate and filtration efficiency in contrast to the other liquid filtration media including spunbond/meltblown sheets, spunbond/meltblown/spunbond sheets, nanofiber sheets and calendered meltblown sheets. This improvement would make it the most suitable for use in the process of the present invention.

We claim:
1. A method for recovering and treating hydrocarbon fluids using a hydraulic fracturing process comprising the steps of:
i) recovering a fluid stream from a well, where the fluid stream comprises liquid or gaseous hydrocarbon species or both, produced water, suspended solids, and dissolved contaminants;

milliliters per minute per centimeter squared of medium per kilopascal pressure of the liquid (ml/min/cm$^2$/kPa), and filtering the produced water with the medium produces a filter cake upstream of, and in contact with, the medium and concentrated with suspended solids and other precipitated particles, and wherein the filter cake is allowed to build to a pre-determined level, and after having reached said level, the filter cake is dewatered, separated from the filter medium, and disposed of separately from the filter medium.

3. The method of claim 2, wherein the filtration medium is used as a component in a filtration system, the filtration system being an automatic pressure filter.

4. The method of claim 2, wherein fracturing additives are added to the injection water upstream or downstream of the filtration system.

5. The methods of claims 1 or 2, wherein the filter medium is replaced when the pressure drop across the medium and filter cake reaches a pre-determined level.

6. The method of claim 1, wherein the filtration medium is used as a component in a filtration system, the filtration system being an automatic pressure filter.

7. The method of claim 1 in which the nonwoven sheet comprises polymeric fibers made from polymers selected from the group consisting of polyolefins, polyesters, polyamides, polyvinylidene fluoride, polyimides, polyaramids, polysulfones and combinations thereof.

8. The method of claim 7, wherein the polymeric fibers are plexifilamentary fiber strands.

9. The method of claim 8, wherein the plexifilamentary fiber strands are made from polyolefin.

10. The method of claim 9, wherein the polyolefin is polyethylene.

11. The method of claim 7, wherein 50% or more of the polymeric fibers have diameters below 1 μm.

12. The method of claim 1, wherein the nonwoven sheet is a uniaxially stretched in the machine direction nonwoven sheet.

13. The method of claim 1 further comprising the steps of:
  i) directing a source fluid to a filtration medium;
  ii) passing essentially all the source fluid though the medium to produce a permeate stream and a filter cake;
  iii) injecting the permeate stream into the subterranean well, such that the fluid stream comprises the permeate stream.

* * * * *